US010934146B2

(12) United States Patent
Cossio-Rojo et al.

(10) Patent No.: US 10,934,146 B2
(45) Date of Patent: Mar. 2, 2021

(54) SYSTEM FOR LOADING LARGE FLUID CONTAINERS AND PUMPING FLUID THEREFROM

(71) Applicant: Magnum Venus Products, Inc., Knoxville, TN (US)

(72) Inventors: Edgar Cossio-Rojo, Enumclaw, WA (US); Michael D. Walch, Port Orchard, WA (US)

(73) Assignee: Magnum Venus Products, Inc., Knoxville, TN (US)

( * ) Notice: Subject to any disclaimer, the term of this patent is extended or adjusted under 35 U.S.C. 154(b) by 85 days.

(21) Appl. No.: 16/166,245

(22) Filed: Oct. 22, 2018

(65) Prior Publication Data

US 2019/0248635 A1    Aug. 15, 2019

Related U.S. Application Data

(60) Provisional application No. 62/630,500, filed on Feb. 14, 2018.

(51) Int. Cl.
*B66F 9/02* (2006.01)
*B65G 7/04* (2006.01)

(52) U.S. Cl.
CPC . *B66F 9/02* (2013.01); *B65G 7/04* (2013.01)

(58) Field of Classification Search
CPC .... B66F 9/02; B66F 1/02; B66F 13/00; B66F 19/00; B66F 2700/025; B66F 2700/09; B65G 3/04; B65G 7/04; B65G 65/005; B65G 65/32; B65G 65/36; B65G 2203/042; B65G 2207/40; B67D 7/0227; B67D 7/645; B05C 11/10; B05C 11/1042; B29B 13/022; B05B 9/047; B05B 9/0409; F04B 15/02; F04B 23/028
USPC ......... 414/485, 490, 568, 403, 422; 222/173
See application file for complete search history.

(56) References Cited

U.S. PATENT DOCUMENTS

| 2,254,317 | A | | 9/1941 | Roberts | |
|---|---|---|---|---|---|
| 4,073,175 | A | * | 2/1978 | Seamon | B66F 9/187 294/68.3 |
| 4,632,281 | A | * | 12/1986 | Wold | B05C 21/00 220/226 |
| 4,635,820 | A | | 1/1987 | Marshall | |
| 4,744,701 | A | | 5/1988 | Chasteen | |
| 5,148,947 | A | * | 9/1992 | Epp | B05C 11/1042 220/4.03 |
| 5,482,421 | A | * | 1/1996 | Cummins | G01G 19/12 177/140 |

(Continued)

OTHER PUBLICATIONS

International Search Report and Written Opinion for PCT/US2019/017919, dated Apr. 29, 2019, 12 pages.

*Primary Examiner* — Glenn F Myers
(74) *Attorney, Agent, or Firm* — Luedeka Neely Group, P.C.

(57) ABSTRACT

A drum loading and unloading system and method for loading and unloading a drum. The system includes a portable base unit having pedestals for holding a drum at a predetermined position for loading and unloading material from the drum; a pair of pneumatic cylinders attached to the portable base supporting a cross-beam; a pumping piston attached to the cross-beam for pumping material into and out of the drum; and a lifting device attached to the cross-beam for lifting the drum onto the pedestals of the portable base.

14 Claims, 10 Drawing Sheets

(56) References Cited

U.S. PATENT DOCUMENTS

| | | | |
|---|---|---|---|
| 5,667,342 | A | 9/1997 | Shutic et al. |
| 5,741,108 | A | 4/1998 | Rolfe |
| 5,772,183 | A * | 6/1998 | Sears ........................ B66C 5/025 |
| | | | 248/333 |
| 5,944,474 | A * | 8/1999 | Cummins ................ B62B 3/104 |
| | | | 294/119.2 |
| 6,152,015 | A | 11/2000 | Migliori |
| 6,481,694 | B2 * | 11/2002 | Kozak ........................ B62B 1/14 |
| | | | 254/325 |
| 6,599,078 | B1 | 7/2003 | Elder |
| 6,755,427 | B1 * | 6/2004 | Bray ........................ B62B 3/104 |
| | | | 222/405 |
| 2007/0292252 | A1 | 12/2007 | McGill et al. |
| 2017/0101265 | A1 * | 4/2017 | Lilley ........................ B65G 7/04 |

* cited by examiner

SYSTEM FOR LOADING LARGE FLUID CONTAINERS AND PUMPING FLUID THEREFROM

RELATED APPLICATION

This application claims priority to provisional application Ser. No. 62/630,500, filed Feb. 14, 2018.

TECHNICAL FIELD

The disclosure is directed to a drum manipulation and pumping system and more particularly to a portable drum pumping station having a drum lifting device and a pump for loading and unloading contents of the drum.

BACKGROUND

Bulk materials such as powders, greases, lubricants, adhesives and the like are typically provided in 55 gallon drums or barrels that must be unloaded at a user's facility. Loaded 55 gallon drums are difficult to handle and maneuver because of their weight. Depending on the bulk materials in the drum, a loaded 55 gallon drum may weigh 600 pounds or more.

Figure 1:
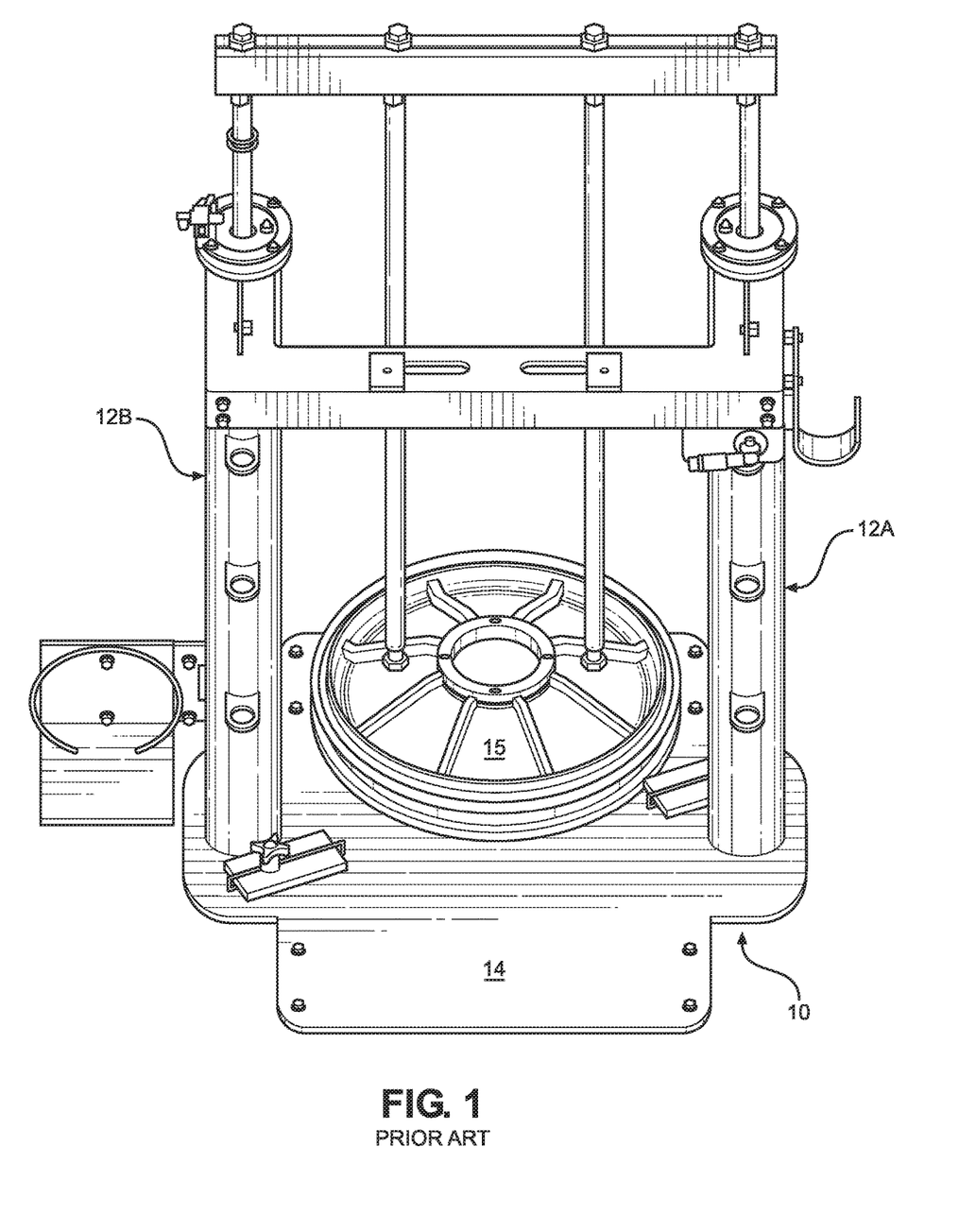
FIG. 1 is a perspective view, not to scale, of a prior art loading and unloading pumping station.

In some applications, the drums contain highly viscous materials that must be pumped or metered into machinery used to manufacture certain goods. Since the drums are often received in a receiving location that is remote from the machinery, the drums must be moved to a drum loading and unloading station that is adjacent to the machinery. Conventional loading and unloading pumping stations, such as station 10 in FIG. 1, are stationary and require the user to load the drums into the stations manually or by using heavy machinery. For example, the user may use a combination of lifting, pulling, and properly aligning the drum to ensure it is centered properly in the pumping station 10. One prior solution to this problem involved providing pistons 12A, 12B on a thin steel plate 14 that can be bolted to the ground as shown in FIG. 1 for moving a loading and unloading drum plunger 15 up and down into a drum. While the pistons 12A,12B make loading and unloading easier, loading and unloading of drums is confined to a predetermined location for the device.

In order to increase mobility with regard to loading and unloading drums, a mobile pumping cart containing the drum plunger may be used. However, the mobile pumping cart still requires that a user lift the drum several inches in order to place the drum on the cart. Manually lifting the drum is not only difficult, it may be dangerous and cause injury to a user. Thus, a separate lifting device or machine must be used to properly place the drum in the pumping station. Accordingly, what is needed is a self-contained mobile pumping station that eliminates the need for manual lifting and maneuvering of the drum and that provides positive positioning of the drum for loading and unloading of the drum's contents.

SUMMARY

In view of the foregoing needs, an embodiment of the disclosure provides a drum loading and unloading system and method for loading and unloading a drum. The system includes a portable base unit having pedestals for holding a drum at a predetermined position for loading and unloading material from the drum; a pair of pneumatic cylinders attached to the portable base supporting a cross-beam; a pumping piston attached to the cross-beam for pumping material into and out of the drum; and a lifting device attached to the cross-beam for lifting the drum onto the pedestals of the portable base.

Another embodiment provides a method for loading and unloading a drum using a high pressure piston plunger. The method includes providing a drum loading and unloading station that has a portable base unit having pedestals for holding a drum at a predetermined position for loading and unloading material from the drum. A pair of pneumatic cylinders are attached to the portable base and support a cross-beam. A plunger is attached to the cross-beam for pumping material into and out of the drum. A lifting device is also attached to the cross-beam for lifting the drum onto the pedestals of the portable base. Prior to loading or unloading, the drum is position adjacent to the loading and unloading station, the drum is lifted off of a floor using the lifting device, the pedestals are positioned to support a lower rim of the drum, the drum is lowered onto the pedestals, and then the plunger is activated to load or unload the drum.

An advantage of the disclosed embodiments is that horseshoe shape of the base eliminates the need to manually lift the drum onto a loading deck and allows a user to wheel an adhesive pumping unit around the drum. The design also allows users of all strengths and sizes to load and unload the contents of heavy drums with ease and efficiency. Thus, the disclosed design will eliminate potential injuries caused by lifting heavy objects or not using proper lifting techniques. Furthermore, the mobile station can be rolled to any location in the shop, as long as there is enough room for the mobile station to fit.

BRIEF DESCRIPTION OF THE DRAWINGS

Further features, advantages and benefits of the disclosed embodiments may be evident by reference to the attached drawing in combination with the following disclosure.

DETAILED DESCRIPTION OF THE EMBODIMENTS

As set forth above, the disclosure provides a portable drum loading and unloading station 16 as shown in FIGS.

Figure 2:
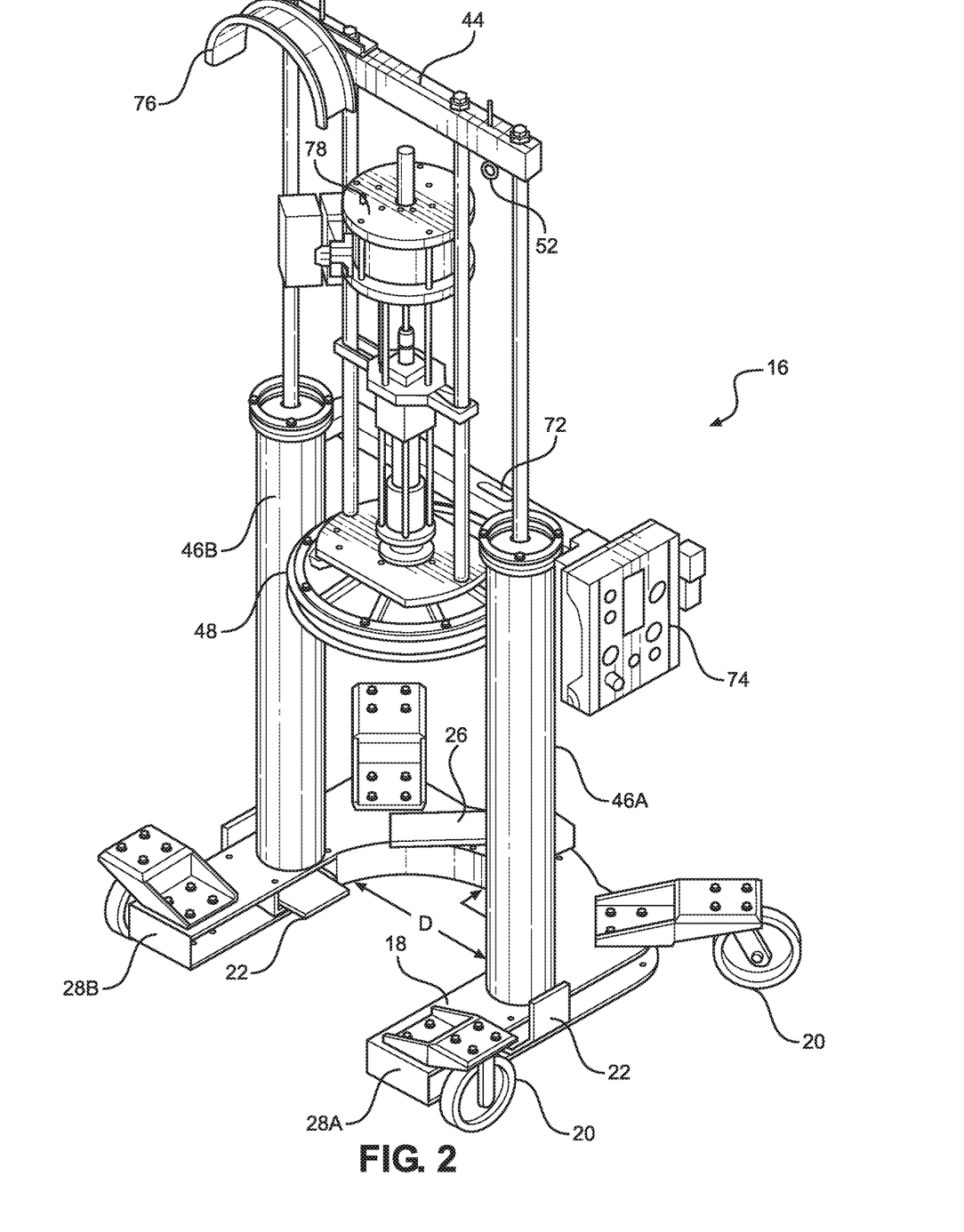
FIG. 2 is a perspective view, not to scale, of a portable drum loading and unloading station according to an embodiment of the disclosure.
Figure 3:
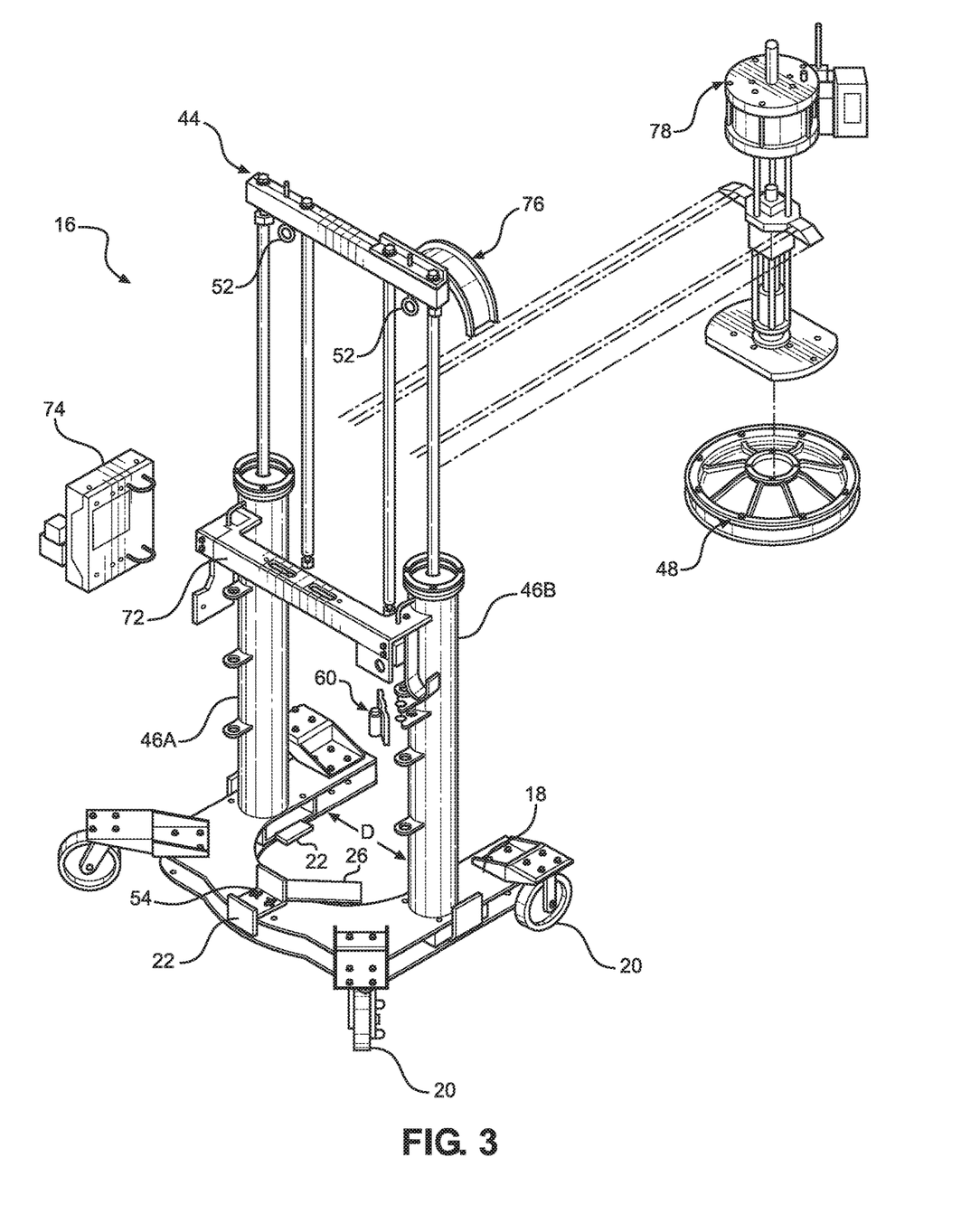
FIG. 3 is a exploded perspective view, not to scale, of the portable drum loading and unloading station according to FIG. 1.
Figure 4:
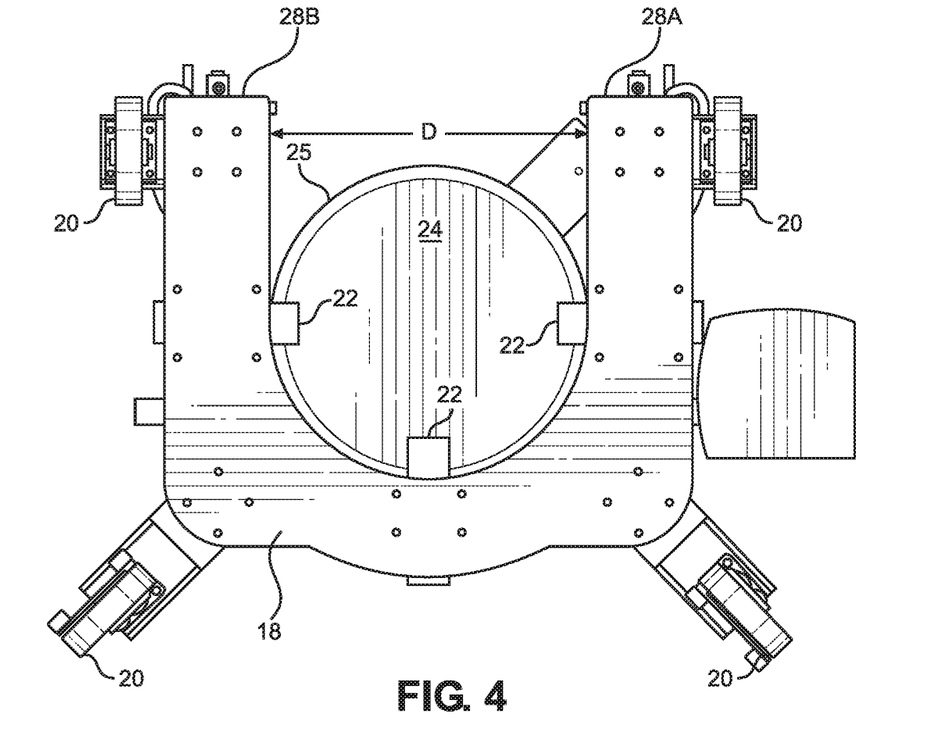
FIG. 4. is a bottom plan view, not to scale, of the portable drum loading station according to FIG. 1.
Figure 5:
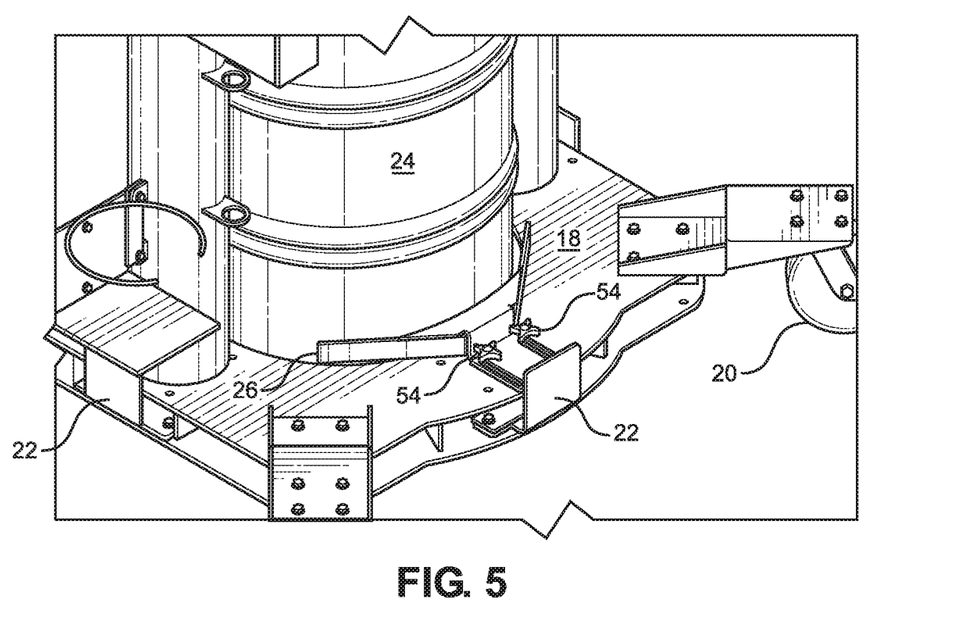
FIG. 5 is a partial perspective view, not to scale, of the portable drum loading station according to FIG. 1.

2-5. An important feature of the station 16 is the mobile horseshoe-shaped base 18 supported by wheels 20. The horseshoe-shaped base 18 also includes a plurality of slide pedestals 22 that support a drum 24 in an elevated position when engaged with a lower rim 25 of the drum 24. The horseshoe-shaped base 18 has an inside diameter (D) that is suitable for a 55 gallon drum as shown in FIG. 4. In order to assure proper alignment of the drum 24 with respect to the horseshoe-shaped base 18, an adjustable centering bracket 26 is attached to the base 18 and is movable to center the drum 24 on the pedestals 22 between arms 28A and 28B of the base 18.

In one embodiment, the slide pedestals 22 are kicked into place to support the drum 24 when the drum is lifted for engagement with the horseshoe-shaped base 18. In another embodiment, an electronic mechanism such as a solenoid may be activated to move the slide pedestals 22 under the drum 24 to support the drum 24 on the pedestals 22 of the base 18. As with the pedestals 22, the centering bracket 26 may be separately moved to adjacent to the drum 24 (FIG. 5) by hand, foot or solenoid valve.

Figure 6:
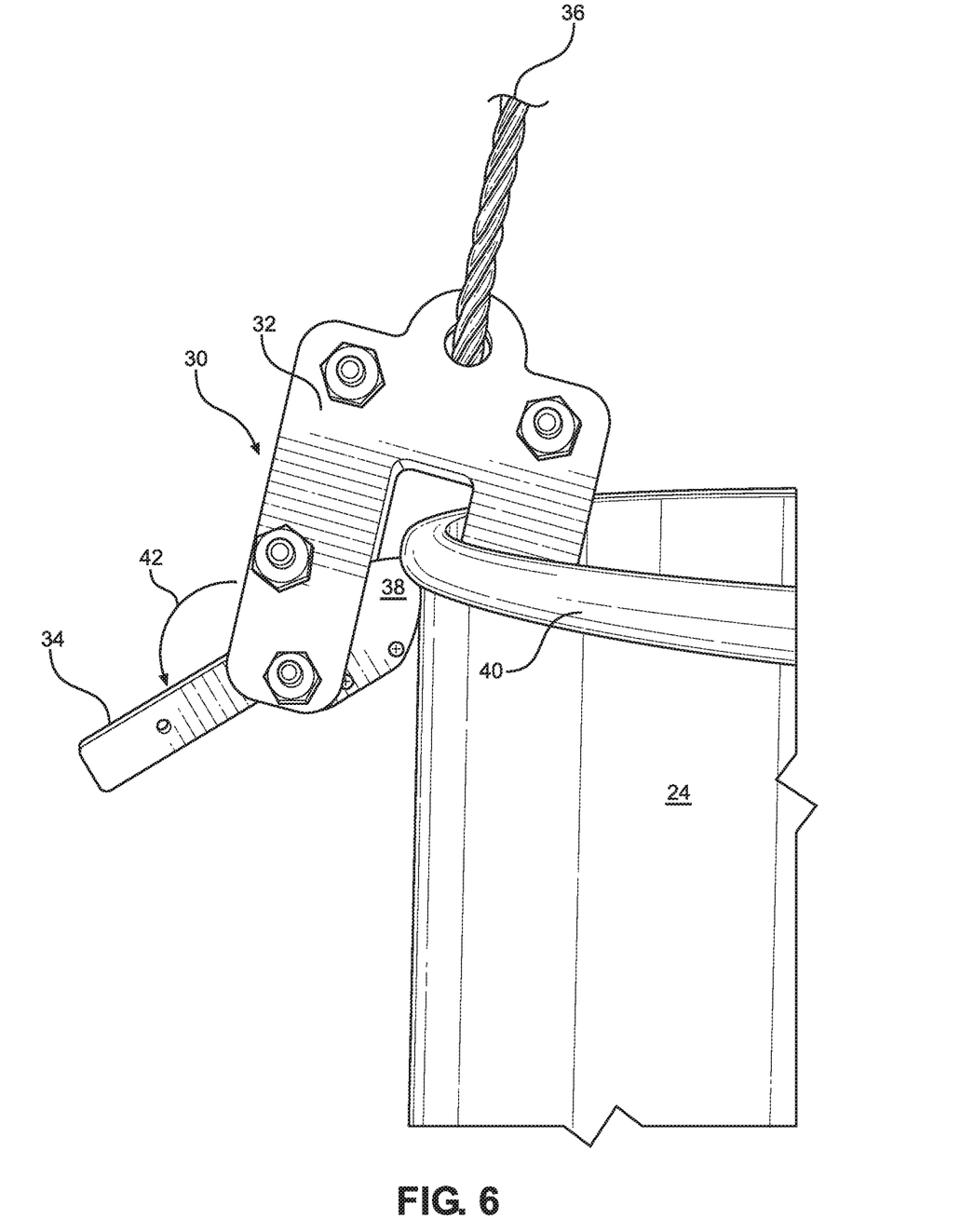
FIGS. 6-7 are partial perspective views, not to scale, of a lifting mechanism for lifting a drum onto the drum loading and unloading station according to FIG. 1.
Figure 7:
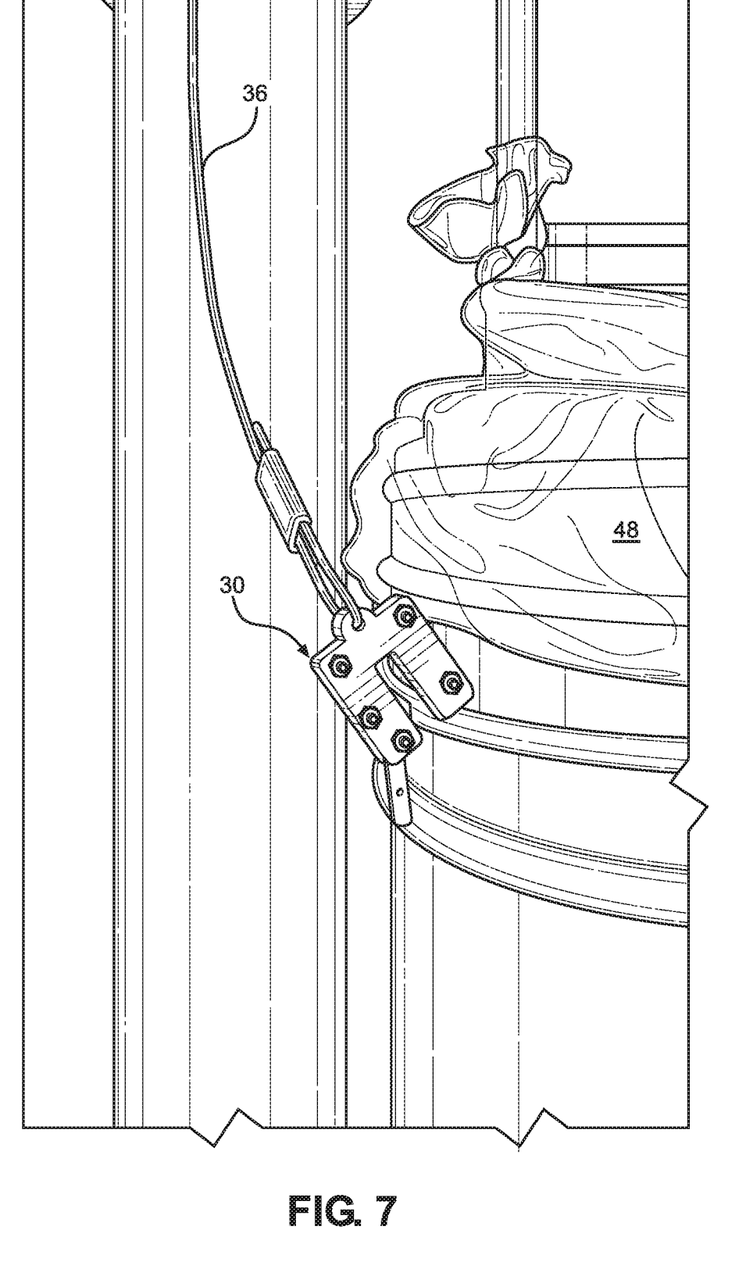
Figure 8:
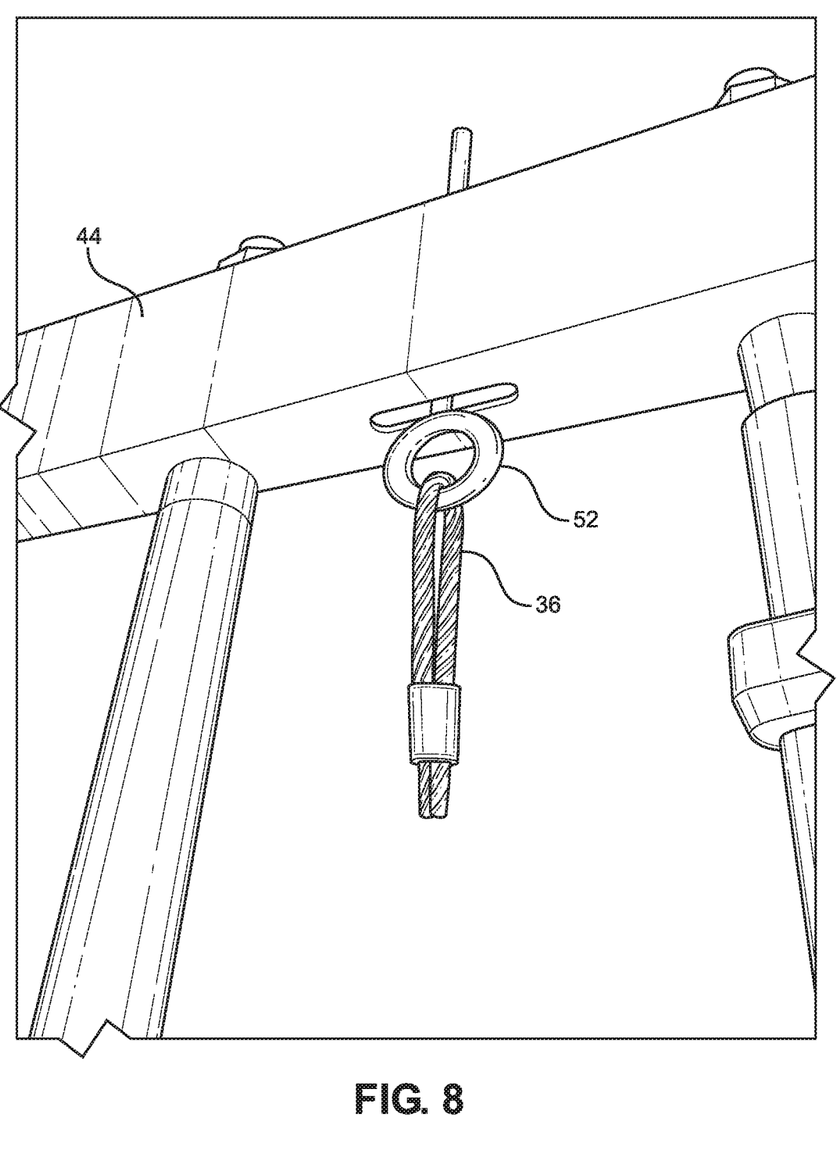
FIG. 8 is a partial perspective view, not to scale of a cable of the lifting mechanism attached to a cross-beam of the drum loading and unloading station according to FIG. 1.

Prior to setting the drum 24 on the pedestals 22, the drum 24 is lifted by two or more lifting mechanisms 30 when the base 18 is rolled into a position adjacent to the drum 24. Each lifting mechanism 30, as shown in FIGS. 6-8, includes a rim engagement bracket 32, a hook tail 34 pivotally attached to the bracket 32, and a cable 36 attached to the bracket 32. The hook tail 34 is pivotally attached to the bracket 32 so that a hook end 38 of the hook tail 34 engages an upper rim 40 of the drum 24 when the hook tail 34 is pivoted by a user to a lifting position on the upper rim 40 of the drum 24. Once the drum 24 is lifted by the cable 36 of the lifting mechanism 30, and the drum is sitting on the engaged pedestals 22, the lifting mechanism 30 may be disengaged with respect to the upper rim 40 by providing slack in the cable 36 (FIG. 7) and pivoting the hook tail 34 in downward direction as indicated by arrow 42. At least two lifting mechanisms 30 are used to evenly lift the drum 24 off of a floor so that the pedestals 22 can be positioned manually or automatically below the lower rim 25 of the drum 24. Accordingly, lifting mechanisms 30 should be disposed on opposite sides of the drum 24, 180 degrees apart so that the drum 24 is not skewed during lifting.

Figure 9:
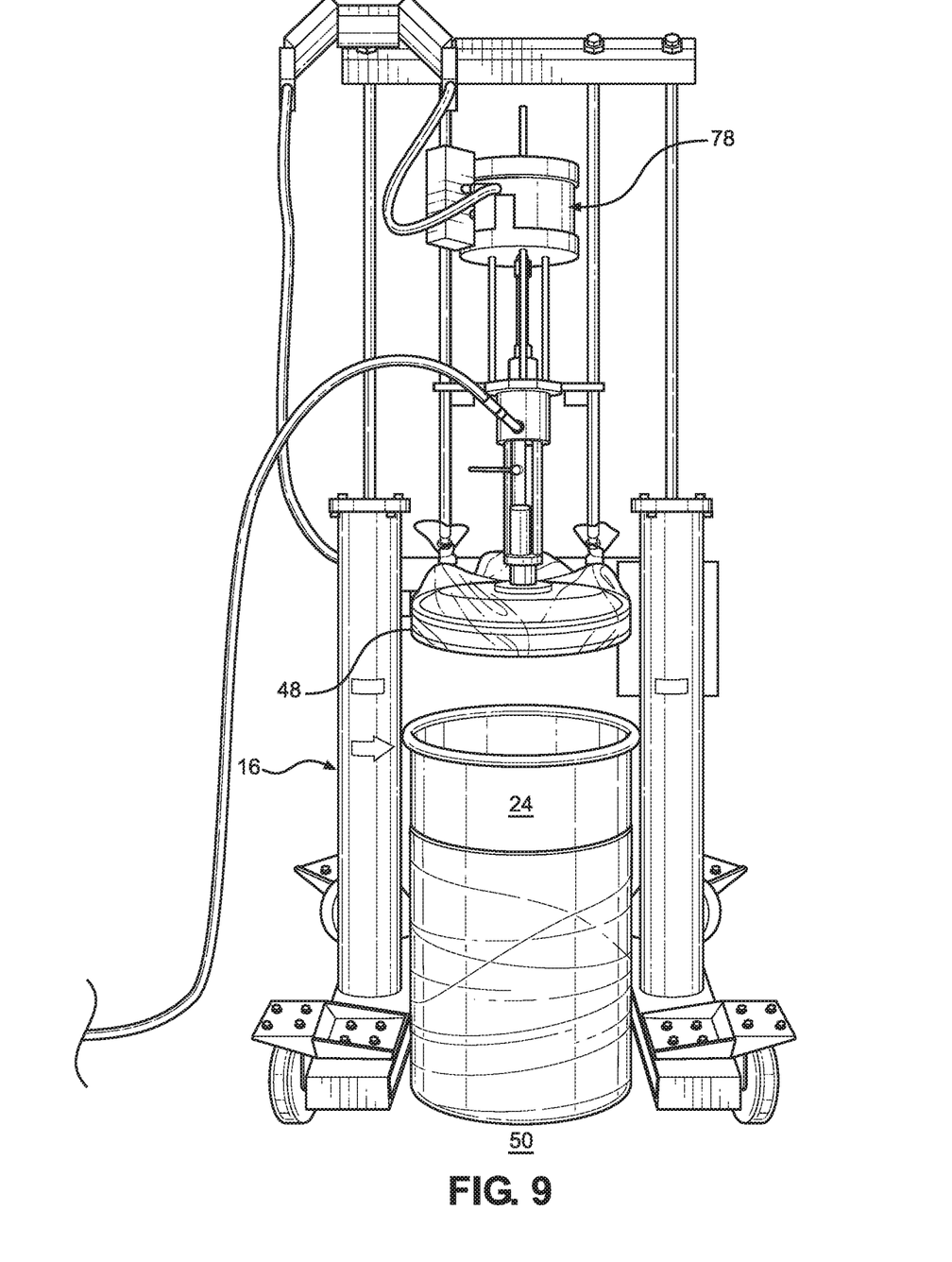
FIG. 9 is a perspective view, not to scale, of a drum on a floor before being lifted onto pedestals of the portable drum loading and unloading station according to FIG. 1.
Figure 10:
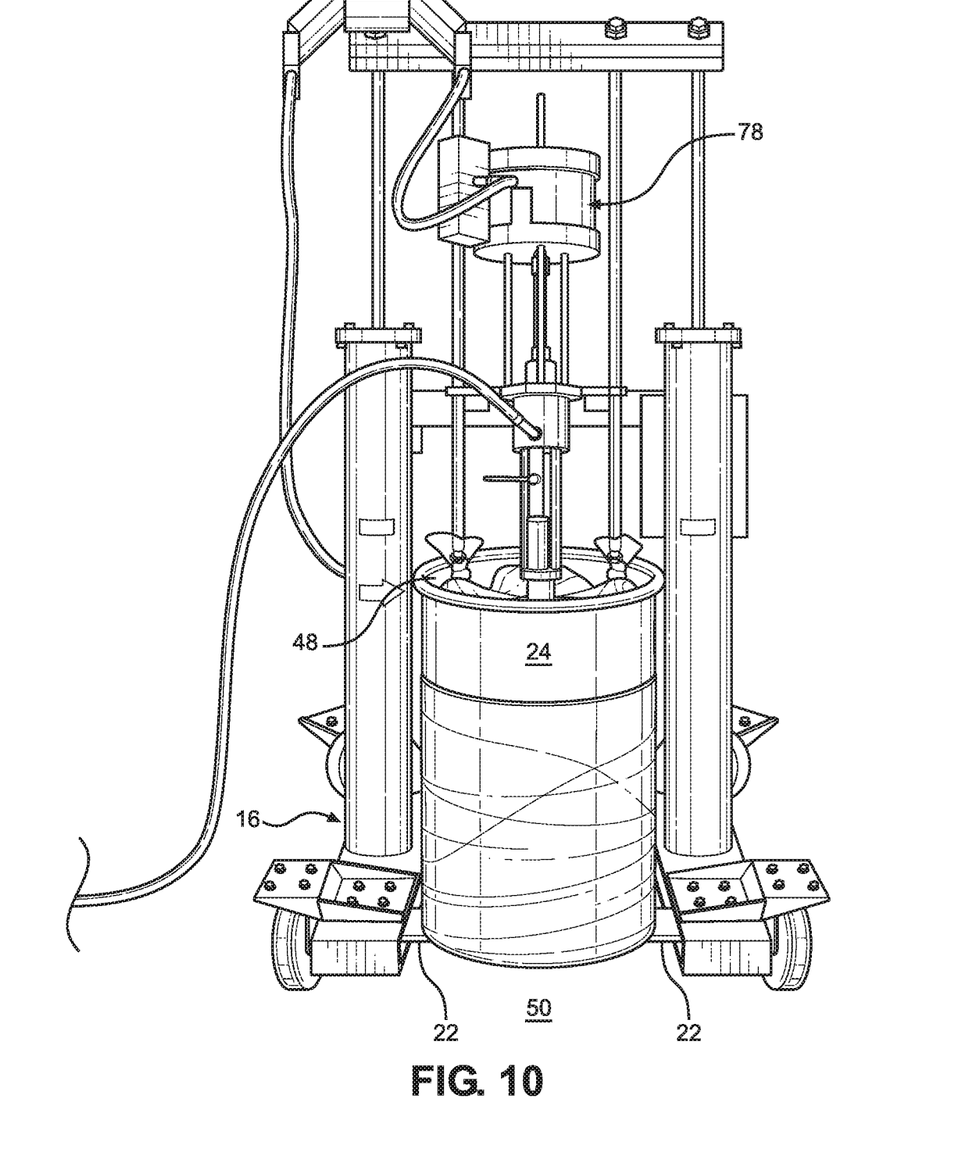
FIG. 10 is a perspective view, not to scale, of a drum after being lifted onto pedestals of the portable drum loading and unloading station according to FIG. 1.

Each cable 36 of each lifting mechanism 30 is attached to a cross-beam 44 that is raised or lowered by a pair of pneumatic cylinders 46A and 46B attached to the base 18. The pneumatic cylinders 46A and 46B may be raised or lowered by air or a hydraulic oil system and are used to raise and lower the cross-beam 44 and attached cables 36 as well as raising and lowering a loading and unloading plunger 48. Once the lifting mechanisms 30 are attached to the drum 24 upper rim 40, the drum 24 may be lifted by the cross-beam 44 so that the pedestals 22 can be positioned beneath the drum 24 to support the drum 24 on the base 18. Pedestals 22 having an L-shape make it easy for a user to kick the pedestals 22 beneath the drum 24 when the drum is lifted off of the floor. FIG. 9 illustrates the pumping stations 16 placed adjacent to the drum 24 that is sitting on a floor 50, while FIG. 10 illustrates the drum that has been lifted and placed on the pedestals 22 of the base 18 with the plunger 48 lowered into the drum 24.

As shown in FIG. 8, the cables 36 may be attached to the cross beam 44 by eyebolts 52 or other adjustable cable attachment devices. It is important that the lifting mechanisms 30 evenly lift the drum 24 to prevent spilling or tipping of the drum 24 while the drum 24 is being raised to adjust the pedestals 22 to support the drum 24. During the lifting step, the drum 24 may be easily positioned so that the plunger 48 is centered on a drum opening. The centering bracket 26 can then be locked into place by wing nuts 54 to prevent the drum 24 from shifting from its centered position on the pedestals 22.

Once finished loading or unloading the drum 24, the lifting mechanisms 30 may be activated to evenly lift the drum 24 so that the pedestals 22 can be withdrawn and the drum 24 set down on the floor 50. Once the drum 24 is set on the pedestals 22 or floor 50, the cross beam 44 can be lowered to provide slack in the cables 36 so that the hook tail 34 of the lifting mechanisms 30 can be pivoted in a downward direction to release the hook end 38 from the upper rim 40 of the drum 24.

Figure 11:
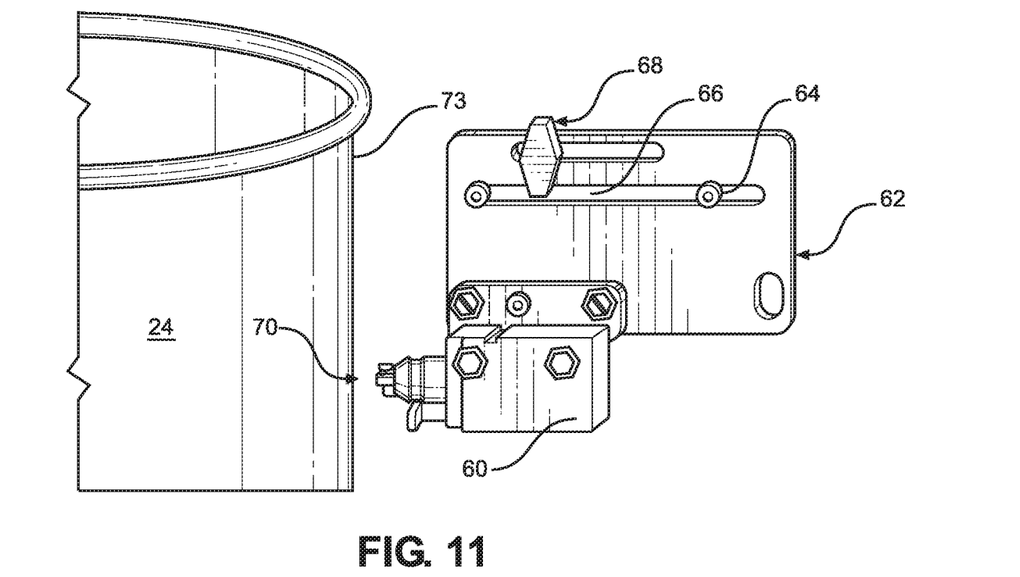
FIGS. 11 and 12 are perspective views, not to scale, of drum sensor for the portable drum loading and unloading station according to FIG. 1.
Figure 12:
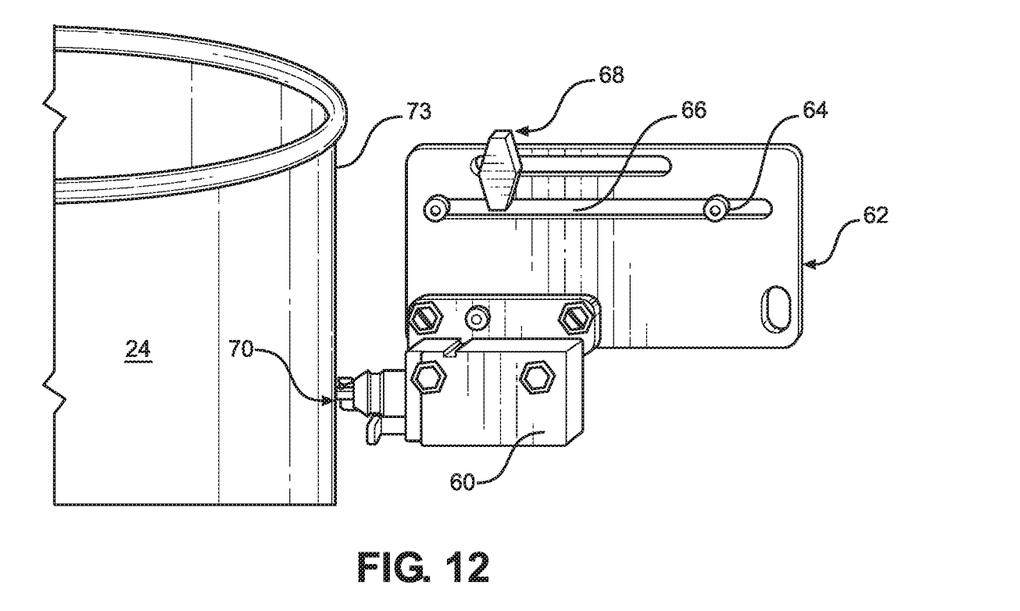

The drum loading and unloading station 16 also includes a drum sensor 60 (FIGS. 11-12) that can be moved to engage the drum 24. The sensor 60 is attached to a slidable bracket 62 that is attached to one of the pneumatic cylinders 46A or 46B or to a frame 72 of the mobile station 16 by shoulder bolts 64 so that a slot 66 in the bracket may enable the bracket 62 to slide on the shoulder bolts 64. A wing nut 68 may be used to tighten the bracket when a sensor head 70 of the drum sensor 60 is adjacent to and engaged with a side wall 73 of the drum 24. When the drum sensor 60 is not engaged with the side wall 73 of the drum 24, a downstroke power of the plunger 48 is limited to prevent the drum 24 from tipping when the plunger is lowered. When the sensor head 70 is engaged with the side wall 73 of the drum 24, full power is restored to the plunger 48.

A control panel 74 may also be attached to the frame 72 of the station 16 to control the pneumatic cylinders 46A and 46B and the operation of the plunger 48 as the drum 24 is loaded and unloaded. A hose carrier 76 may be attached to the cross beam 44 to prevent a loading and unloading hose from tangling during a drum loading and unloading operation. As shown in FIGS. 2 and 3, a conventional plunger drive mechanism 78 may be used to raise and lower the plunger 48 to load and unload a drum 24.

The unique design of the drum loading and unloading station 16 described herein is unlike any other pumping system for high-viscosity materials currently available. The distinct, mobile, horseshoe-shaped base 18 (FIG. 1) allows for easier loading and unloading of 55-gallon drums 24, which can weigh more than 600 lbs depending on material.

The horseshoe shape of the base 18 eliminates the need to manually lift the drum 24 onto a loading deck. Accordingly, the horseshoe shape allows a user to wheel an adhesive pumping unit around the drum 24 rather than lifting the drum 24 onto a platform as shown in FIG. 1. The design allows users of all strengths and sizes to load and unload the contents of heavy drums 24 with ease and efficiency. The design will also eliminate potential injuries caused by lifting heavy objects or not using proper lifting techniques. The mobile station 16 can be rolled to any location in the shop, as long as there is enough room for the mobile station 16 to fit.

Another advantageous feature of the mobile station 16 is that it contains a lifting mechanism 30 that can lift drums 24 into place for loading and unloading. Supplying compressed air or a hydraulic oil to either the top side or underside of the pneumatic cylinders 46A-46B produces a downstroke or upstroke respectively. An upstroke of the pneumatic cylinders 46A-46B may be used in combination with the lifting mechanism 30 to lift the drum 24 off of the floor 50 thereby allowing the pedestals 22 to be extended beneath the drum 24 to support the drum 24 on the base 18. The pneumatic cylinders 46A-46B not only provide power to help pump high viscosity materials, but they also make up an integral part of the support structure of the high force plunger 48. By being welded to the base 18, the cylinders 46A-46B help in the transfer of energy that is useful in pumping high-viscosity material from the drum 24.

In summary, mobile pumping station 16 described herein gives users the ability to load and unload drums faster, safer, and easier than any other design currently available. In addition, this new design gives the end user more mobility, with the ability to wheel the station 16 anywhere in the shop. Finally, the new loading/unloading station 16 allows for a multitude of diverse users to easily and safely load heavy material drums 24.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A drum loading and unloading station comprising:
   a portable base having slidably positionable pedestals for holding a drum at a predetermined position for loading and unloading material from the drum;
   a pair of pneumatic cylinders attached to the portable base supporting a cross-beam;
   a plunger attached to the cross-beam for pumping material into and out of the drum; and
   a lifting device attached to the cross-beam for lifting the drum onto the slidably positionable pedestals of the portable base, the lifting device comprising two or more lifting hooks and a cable for each lifting hook attached to the cross-beam for engaging a top rim of the drum, wherein each lifting hook comprises a bracket attached to the cable and a hook tale pivotally attached to the bracket.

2. The drum loading and unloading station of claim 1, wherein the pedestals are slidably positionable on the portable base to below a lower rim of the drum when the drum is in a lifted position.

3. The drum loading and unloading station of claim 1, further comprising a centering bracket on the portable base for centering the drum on the portable base.

4. The drum loading and unloading station of claim 1, further comprising one or more drum sensors for sensing drum position on the portable base, wherein downstroke power to the plunger is limited when the drum sensor is not engaged with the drum.

5. The drum loading and unloading station of claim 1, wherein the pneumatic cylinders are air operated double acting pneumatic cylinders.

6. The drum loading and unloading station of claim 1, wherein the portable base is horseshoe-shaped and has opposing arms between which the drum is placed.

7. A method for loading and unloading a drum using a high pressure piston plunger comprising:
   providing a drum loading and unloading station including:
      a portable base having slidably positionable pedestals for holding a drum at a predetermined position for loading and unloading material from the drum;
      a pair of pneumatic cylinders attached to the portable base supporting a cross-beam;
      a plunger attached to the cross-beam for pumping material into and out of the drum; and
      a lifting device attached to the cross-beam for lifting the drum onto the pedestals of the portable base;
   positioning the drum adjacent to the loading and unloading station;
   lifting the drum off of a floor using the lifting device;
   positioning the pedestals to support a lower rim of the drum;
   lowering the drum onto the pedestals; and
   activating the plunger to load or unload the drum.

8. The method of claim 7, wherein the pedestals are slidably positioned on the portable base to below the lower rim of the drum when the drum is in the lifted position.

9. The method of claim 7, further comprising centering the drum on the portable base by engaging a centering bracket with a side wall of the drum.

10. The method of claim 7, further comprising sensing a position of the drum on the portable base using one or more drum sensors and limiting a downstroke power to the plunger when the one or more drum sensors are not engaged with the drum.

11. The method of claim 7, wherein the lifting device comprises two or more lifting hooks and a cable for each lifting hook attached to the cross-beam for engaging a top rim of the drum, further comprising raising the cross-beam to lift the drum, wherein each lifting hook comprises a bracket attached to the cable and a hook tale pivotally attached to the bracket.

12. The method of claim 7, wherein the pneumatic cylinders are air operated double acting pneumatic cylinders.

13. The method of claim 7, wherein the portable base is horseshoe shaped, the method further comprising placing the drum between opposing arms of the horseshoe-shaped base.

14. A drum loading and unloading station comprising:
   a portable base having slidably positionable pedestals for holding a drum at a predetermined position for loading and unloading material from the drum;
   a pair of pneumatic cylinders attached to the portable base supporting a cross-beam;
   a plunger attached to the cross-beam for pumping material into and out of the drum;

a lifting device attached to the cross-beam for lifting the drum onto the slidably positionable pedestals of the portable base; and one or more drum sensors for sensing drum position on the portable base, wherein downstroke power to the plunger is limited when one or more of the one or more drum sensors are not engaged with the drum.

\* \* \* \* \*